United States Patent
Hill et al.

(10) Patent No.: US 11,803,811 B2
(45) Date of Patent: *Oct. 31, 2023

(54) SYSTEM FOR VALIDATED TRACKING OF EVENTS ASSOCIATED WITH EQUIPMENT DURING A RESOURCE ARRANGEMENT

(71) Applicant: BANK OF AMERICA CORPORATION, Charlotte, NC (US)

(72) Inventors: Christine Meloro Hill, Charlotte, NC (US); G. Alister Bazaz, Atlanta, GA (US); Lalit Dhawan, Franklin Park, NJ (US); Robert N. Gridley, Milton, GA (US); Manu Jacob Kurian, Dallas, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/827,081

(22) Filed: May 27, 2022

(65) Prior Publication Data

US 2022/0284387 A1    Sep. 8, 2022

Related U.S. Application Data

(63) Continuation of application No. 16/831,335, filed on Mar. 26, 2020, now Pat. No. 11,367,045.

(51) Int. Cl.
*G06Q 10/087* (2023.01)
*G06F 16/27* (2019.01)
*G06Q 40/08* (2012.01)

(52) U.S. Cl.
CPC .......... *G06Q 10/087* (2013.01); *G06F 16/27* (2019.01)

(58) Field of Classification Search
CPC ............................ G06Q 10/087; G06F 16/27
USPC ........................................................ 705/28
See application file for complete search history.

(56) References Cited

U.S. PATENT DOCUMENTS

| | | |
|---|---|---|
| 9,635,006 B2 | 4/2017 | Oz et al. |
| 9,818,154 B1 | 11/2017 | Wilbert et al. |
| 10,198,609 B1 * | 2/2019 | Tripathy ................ G06Q 20/00 |
| 10,332,124 B2 | 6/2019 | Avary et al. |
| 10,332,208 B1 | 6/2019 | Loo et al. |

(Continued)

*Primary Examiner* — Garcia Ade
(74) *Attorney, Agent, or Firm* — Moore & Van Allen PLLC; James C. Edwards

(57) ABSTRACT

Validated tracking of events associated with equipment during the course of a resource arrangement. The events include location-changing events, which provide for a physical change in location of the equipment. The verified tracking of the events is provided by a distributed trust computing network, which through convergence by one or more decentralized nodes provides for authenticating/validating data stored within distributed registers/ledgers. Specific to the invention, once a location-changing event is determined/detected, the location-changing event is registered in the distributed trust computing network by creating and validating a data block within a distributed register/ledger that includes information pertaining to the location-changing event. In this regard, the existence of the data block within the distributed register/leger serves as a verified source of truth of the occurrence of the location-change event, which is capable of identifying the verified current location of the equipment at any point in time.

20 Claims, 9 Drawing Sheets

(56) References Cited

U.S. PATENT DOCUMENTS

| | | | |
|---|---|---|---|
| 10,438,037 | B1 | 10/2019 | Tripathy et al. |
| 2006/0143112 | A1 | 6/2006 | Donarski et al. |
| 2017/0046664 | A1 | 2/2017 | Haldenby et al. |
| 2017/0228731 | A1 | 8/2017 | Sheng et al. |
| 2017/0236094 | A1 | 8/2017 | Shah |
| 2018/0012311 | A1 | 1/2018 | Small et al. |
| 2018/0018723 | A1 | 1/2018 | Nagla et al. |
| 2018/0096175 | A1 | 4/2018 | Schmeling et al. |
| 2018/0129945 | A1 | 5/2018 | Saxena et al. |
| 2018/0165763 | A1 | 6/2018 | Dolle et al. |
| 2018/0337769 | A1* | 11/2018 | Gleichauf ............ G06Q 20/308 |
| 2019/0220861 | A1* | 7/2019 | Silver .................... G06Q 40/08 |
| 2019/0303463 | A1 | 10/2019 | Catalano et al. |
| 2019/0378357 | A1 | 12/2019 | Avary et al. |
| 2020/0101367 | A1* | 4/2020 | Tran ........................ H04Q 9/00 |

\* cited by examiner

SYSTEM FOR VALIDATED TRACKING OF EVENTS ASSOCIATED WITH EQUIPMENT DURING A RESOURCE ARRANGEMENT

CROSS-REFERENCE TO RELATED APPLICATION

The present application is a continuation application of and claims priority to U.S. patent application Ser. No. 16/831,335 filed Mar. 26, 2020 of the same title; the contents of which are also incorporated by reference herein.

FIELD OF THE INVENTION

The present invention is generally directed to data verification and, more specifically, providing verified tracking of equipment during a resource arrangement.

BACKGROUND

In certain instances, it is essential for entities, such as an entity having a vested or collateralized interest in equipment, to have verified knowledge as to the existence and, more specifically, the location of the equipment. In such instances, the entity is typically tasked with physically visiting the location at which the equipment is purported to be at in order to verify the authenticity of the equipment's location. Such a process is not only inefficient but is also prone to inaccuracies in terms of identifying the current location of specific equipment. Moreover, during the period in which an entity has the vested/collateralized interest in the equipment, the entities associated may have a need for verification/authentication of the other events related to the resource arrangement pertaining to the vested interest.

Therefore, a need exits to provide systems, computer-implemented methods, computer program products and the like for validated tracking of events associated with equipment during a resource arrangement. Specifically, validated tracking of events should include tracking location-changing events (e.g., movement or transport of the equipment) incurred by the equipment during the course of the resource arrangement. In addition, the desired systems and the like should validate other events, such as resource arrangement-related events and the like that occur during the course of the resource arrangement.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing for validated tracking of events associated with equipment during the course of a resource arrangement. In specific embodiments of the invention, the events include location-changing events, which provide for a physical change in location of the equipment. The verified tracking of the events is provided by a distributed trust computing network, which through convergence by one or more decentralized nodes provides for authenticating/validating data stored within distributed registers/ledgers. Therefore, once a location-changing event is determined/detected, the location-changing event is registered in the distributed trust computing network by creating and validating a data block within a distributed register/ledger that includes information pertaining to the location-changing event. In this regard, the existence of the data block within the distributed register/leger serves as a verified source of truth of the occurrence of the location-change event, which is capable of identifying the verified current location of the equipment at any point in time.

Further, in specific embodiments, the invention is further capable of tracking other events associated with the equipment, such as resource arrangement-related events and the like. For example, the invention may track the occurrence of a change in property rights (e.g., tile transfer) associated with the equipment and register the event in the distributed register/ledger. Further, the distributed ledger may be configured with logic that recognizes the event and, in response, performs one or more predetermined actions (e.g., satisfying outstanding obligations associated with the resource arrangement or the like).

Moreover, embodiments of the present invention are able to provide access to the validated information stored on the distributed register/ledger to a plurality of different entities on a need-to-know basis. In this regard, designated entities may be provided access to limited portions (i.e., specified data blocks) of the distributed register/ledger based on system operator selection.

A system for validated tracking of events associated with equipment defines first embodiments of the invention. The system includes a distributed trust computing network that includes a plurality of decentralized nodes. Each decentralized node has a first memory and at least one first processing device in communication with the first memory. The first memory of the decentralized nodes is configured to store a plurality of distributed registers/ledgers, each distributed register comprising a plurality of blocks of data.

The system additionally includes a computing platform disposed in a distributed computing network and including a second memory and at least one second processing device in communication with the second memory. The second memory stores instructions that are executable by the at least one second processing device. The instructions are configured to receive indication of a resource arrangement associated with an equipment and, in response, initiate generation of one of the plurality of distributed registers/ledgers. The distributed register/ledger stores an equipment identifier, resource arrangement information and equipment information. The instructions are further configured to determine that the equipment has incurred a location-changing event and, in response, register the location-changing event within the distributed trust computing network by creating a first block within the distributed register that includes information associated with the location-changing event. The registering of the location-changing event within the distributed trust computing network provides for validating authenticity of the location-changing event.

In specific embodiments of the system, the instructions are further configured to determine an occurrence of a resource arrangement-related event, and, in response, register the resource arrangement-related event with the distributed trust computing network by creating a second block within the distributed register that includes information associated with the resource arrangement-related event. The registering of the resource arrangement-related event within the distributed trust computing network provides for validating authenticity of the resource arrangement-related event. In further specific embodiments of the system, the resource arrangement-related event is a transfer in title of the equipment from a resource recipient of the resource arrangement to a third-party entity. In such embodiments of the system, the instructions may be further configured to, in response to the transfer of title, initiate a final resource transfer from the resource recipient to a resource provider of the resource arrangement to complete the resource arrangement. In other such embodiments of the system, the instructions may be further configured to, in response to the transfer of title, generate documentation associated with the transfer of title and register the documentation with the distributed trust computing network by creating a third block within the distributed register that includes information associated with the documentation.

In specific embodiments of the system, the location-changing event may include one of (i) physical movement of the equipment from a first location associated with an equipment provider to a second location associated with a resource recipient of the resource arrangement, (ii) physical movement of the equipment within a geo-fenced region defined by a location associated with a resource recipient of the resource arrangement, (iii) physical movement of the equipment outside of a geo-fenced region defined by a location associated with a resource recipient of the resource arrangement, and (iv) physical movement of the equipment from a first location associated with a first resource recipient of the resource arrangement to a second location associated with a transferred resource recipient of the resource arrangement.

In still further specific embodiments of the system, the instructions are further configured to provide a resource recipient of the resource arrangement access to at least a portion of the distributed register to verify a current location of the equipment. While in other related embodiments of the invention, the instructions are further configured to provide an insurer of the equipment access to at least a portion of the distributer register to verify a current location of the equipment. Moreover, in other embodiments of the system, the instructions are further configured to provide a resource provider associated with a second tier resource arrangement, conducted for purposes of a change in title, access to at least a portion of the distributed register to verify a chain of title in the equipment.

A computer-implemented method for validated tracking of events associated with equipment defines second embodiments of the invention. The method is executed by one or more computer processor devices. The method includes receiving indication of a resource arrangement associated with an equipment, and, in response, initiating generation of a distributed register stored within nodes of a distributed trust computing network. The distributed register stores an equipment identifier, resource arrangement information and equipment information. The method further includes determining that the equipment has incurred a location-changing event, and, in response, registering the location-changing event within the distributed trust computing network by creating a first block within the distributed register that includes information associated with the location-changing event. The registering of the location-changing event within the distributed trust computing network provides for validating authenticity of the location-changing event.

In specific embodiments the method further includes determining an occurrence of a resource arrangement-related event and, in response, registering the resource arrangement-related event with the distributed trust computing network by creating a second block within the distributed register that includes information associated with the resource arrangement-related event. The registering of the resource arrangement-related event within the distributed trust computing network provides for validating authenticity of the of the resource arrangement-related event. In such embodiments of the method, the resource arrangement-related event may be a transfer in title of the equipment from a resource recipient of the resource arrangement to a third-party entity. In such embodiments the method may further include, in response to the transfer of title, initiating a final resource transfer from the resource recipient to a resource provider of the resource arrangement to complete the resource arrangement. In other such embodiments the method may further include, in response to the transfer of title, generating documentation associated with the transfer of title, and registering the documentation with the distributed trust computing network by creating a third block within the distributed register that includes information associated with the documentation.

In specific embodiments of the method, the location-changing event is chosen from the group comprising of (i) physical movement of the equipment from a first location associated with an equipment provider to a second location associated with a resource recipient of the resource arrangement, (ii) physical movement of the equipment within a geo-fenced region defined by a location associated with a resource recipient of the resource arrangement, (iii) physical movement of the equipment outside of a geo-fenced region defined by a location associated with a resource recipient of the resource arrangement, and (iv) physical movement of the equipment from a first location associated with a first resource recipient of the resource arrangement to a second location associated with a transferred resource recipient of the resource arrangement.

A computer program product including a non-transitory computer-readable medium defines third embodiments of the invention. The computer-readable medium includes a first set of codes for causing a computer processor to receive indication of a resource arrangement associated with an equipment and a second set of codes for causing a computer processor to initiate generation of a distributed register stored within nodes of a distributed trust computing network, wherein the distributed register stores an equipment identifier, resource arrangement information and equipment information. In addition, the computer-readable medium includes a third set of codes for causing a computer processor to determine that the equipment has incurred a location-changing event and a fourth set of codes for causing a computer processor to register the location-changing event within the distributed trust computing network by creating a first block within the distributed register that includes information associated with the location-changing event. The registering of the location-changing event within the distributed trust computing network provides for validating authenticity of the of the location-changing event.

In specific embodiments of the computer program product, the computer-readable medium additionally includes a fifth set of codes for causing a computer processor to determine an occurrence of a resource arrangement-related event, and a sixth set of codes for causing a computer processor to register the resource arrangement-related event with the distributed trust computing network by creating a second block within the distributed register that includes information associated with the resource arrangement-related event. The registering of the resource arrangement-related event within the distributed trust computing networks provides for validating authenticity of the of the resource arrangement-related event. In such specific embodiments of the computer program product, the resource arrangement-related event may be a transfer in title of the equipment from a resource recipient of the resource arrangement to a third-party entity. In such embodiments of the computer program product, the computer-readable medium may further include a seventh set of codes configured to cause a computer processor to, in response to the transfer of title, initiating a final resource transfer from the resource recipient to a resource provider of the resource arrangement to complete the resource arrangement. In other such embodiments of the computer program product, the computer-readable medium further includes a seventh set of codes for causing a computer processor to, in response to the transfer of title, generate documentation associated with the transfer of title, and register the documentation with the distributed trust computing network by creating a third block within the distributed register that includes information associated with the documentation.

In specific embodiments of the computer program product, the location-changing event is chosen from the group comprising of (i) physical movement of the equipment from a first location associated with an equipment provider to a second location associated with a resource recipient of the resource arrangement, (ii) physical movement of the equipment within a geo-fenced region defined by a location associated with a resource recipient of the resource arrangement, (iii) physical movement of the equipment outside of a geo-fenced region defined by a location associated with a resource recipient of the resource arrangement, and (iv) physical movement of the equipment from a first location associated with a first resource recipient of the resource arrangement to a second location associated with a transferred resource recipient of the resource arrangement.

Thus, according to embodiments of the invention, which will be discussed in greater detail below, the present invention provides for validated tracking of events associated with equipment during the course of a resource arrangement. In specific embodiments of the invention, the events include location-changing events, which provide for a physical change in location of the equipment. The verified tracking of the events is provided by a distributed trust computing network, which through convergence by one or more decentralized nodes provides for authenticating/validating data stored within distributed registers/ledgers. Therefore, once a location-changing event is determined/detected, the location-changing event is registered in the distributed trust computing network by creating and validating a data block within a distributed register/ledger that includes information pertaining to the location-changing event. In this regard, the existence of the data block within the distributed register/leger serves as a verified source of truth of the occurrence of the location-change event, which is capable of identifying the verified current location of the equipment at any point in time.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
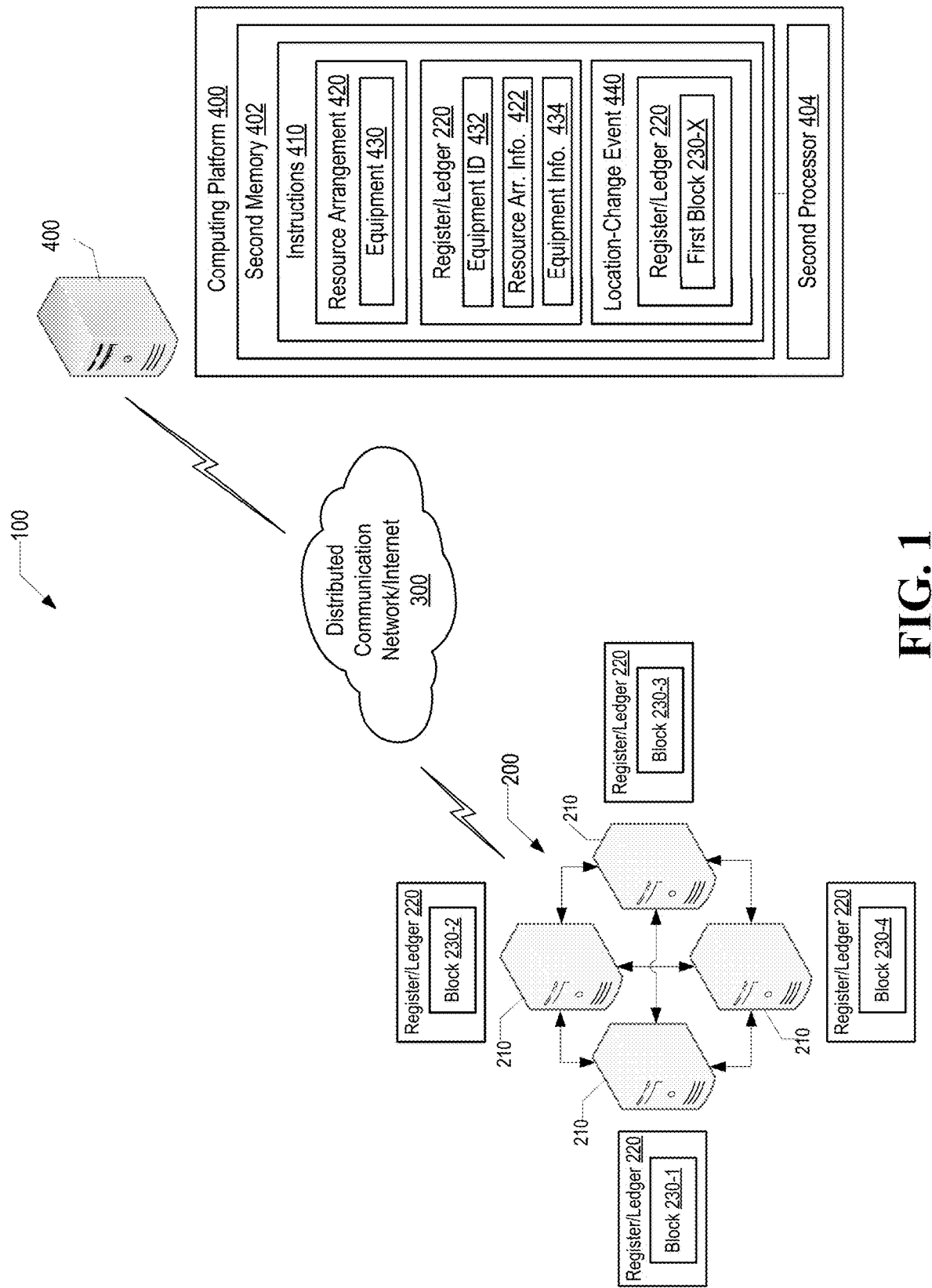
Figure 2:
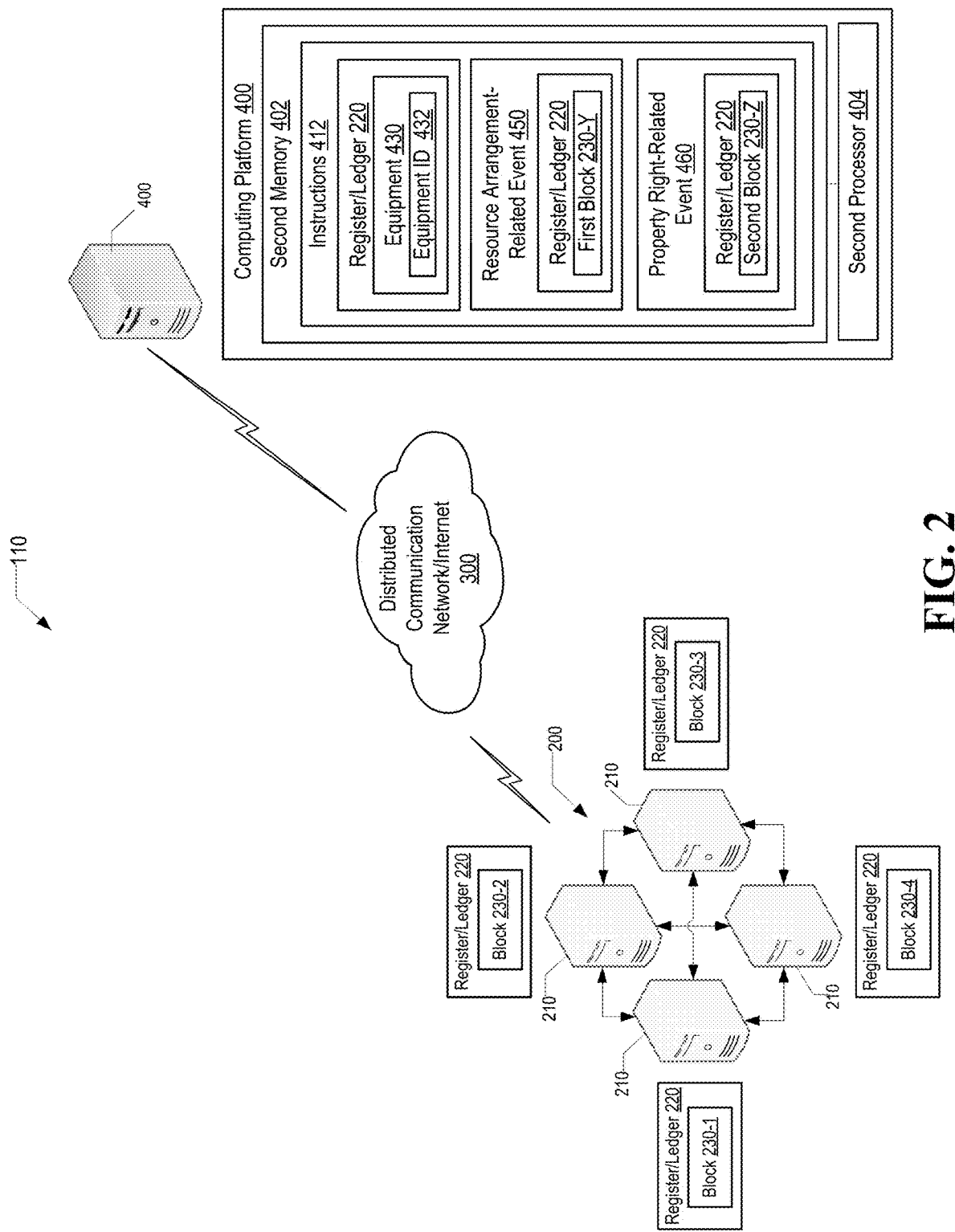
Figure 3:
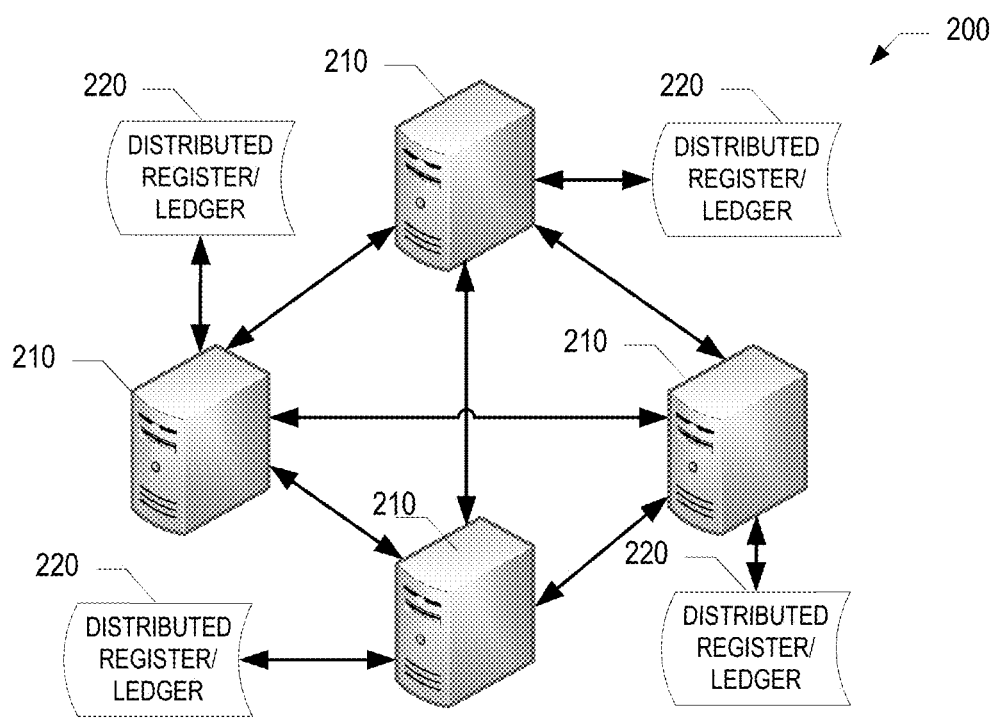
Figure 4:
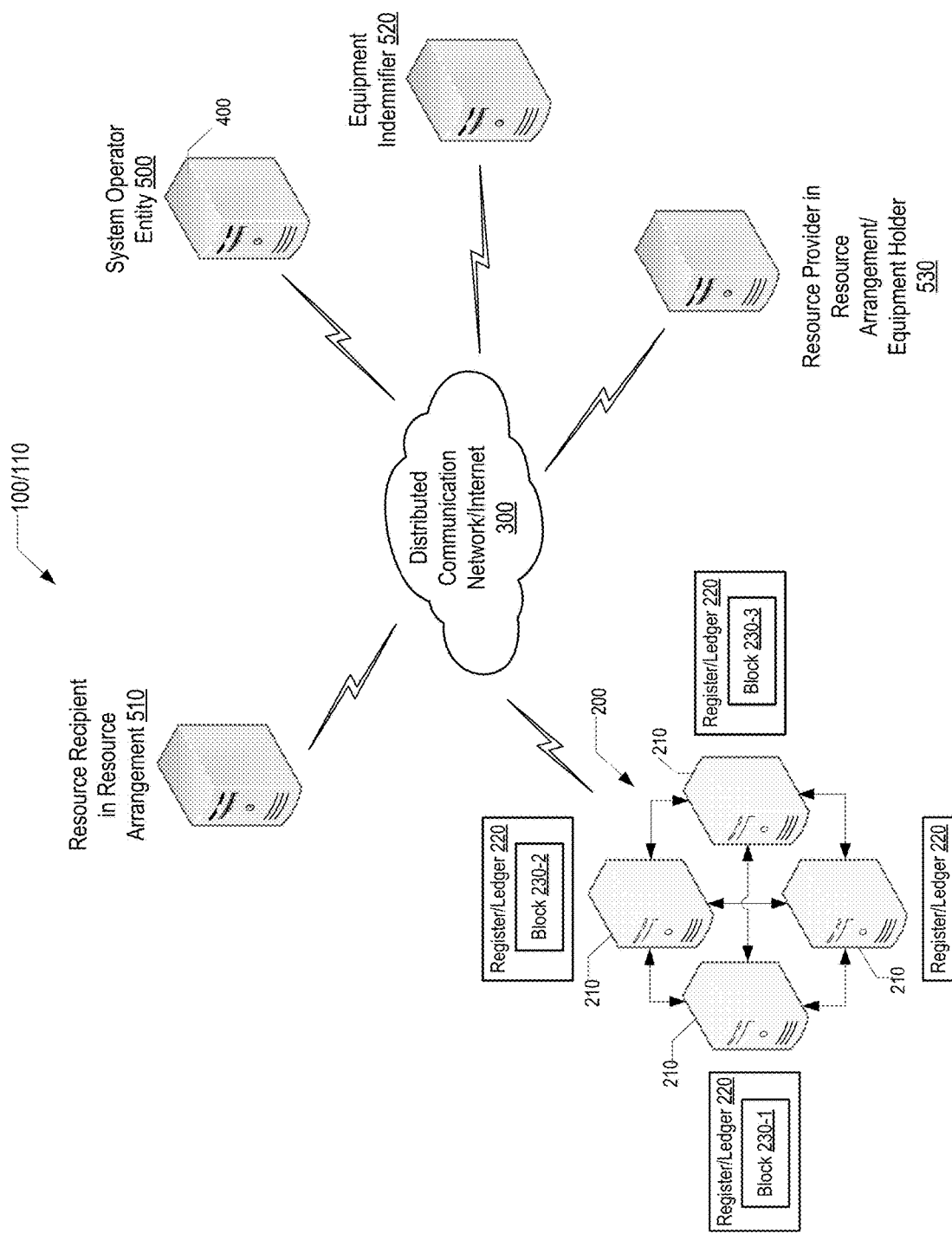
Figure 5:
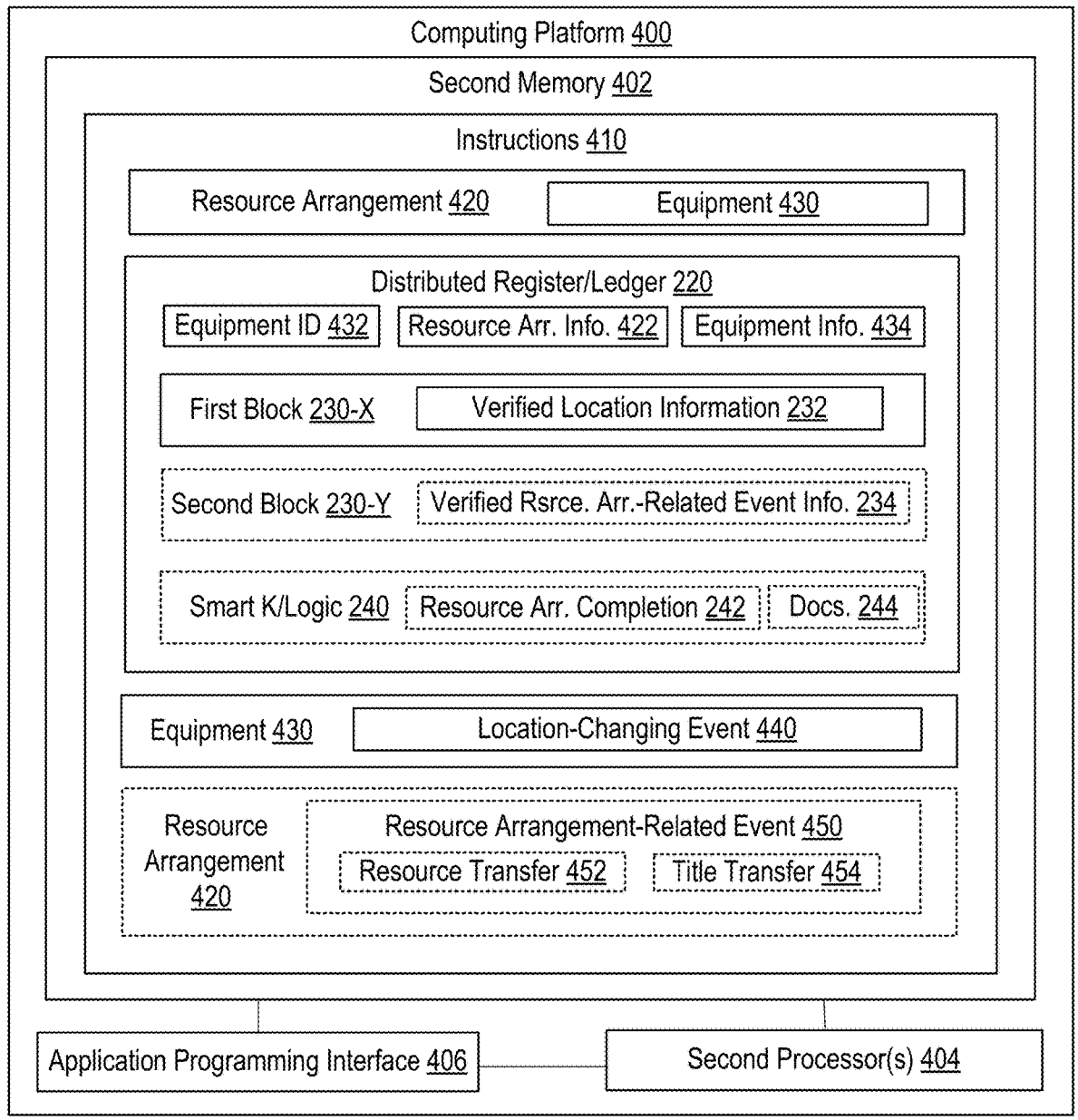
Figure 6:
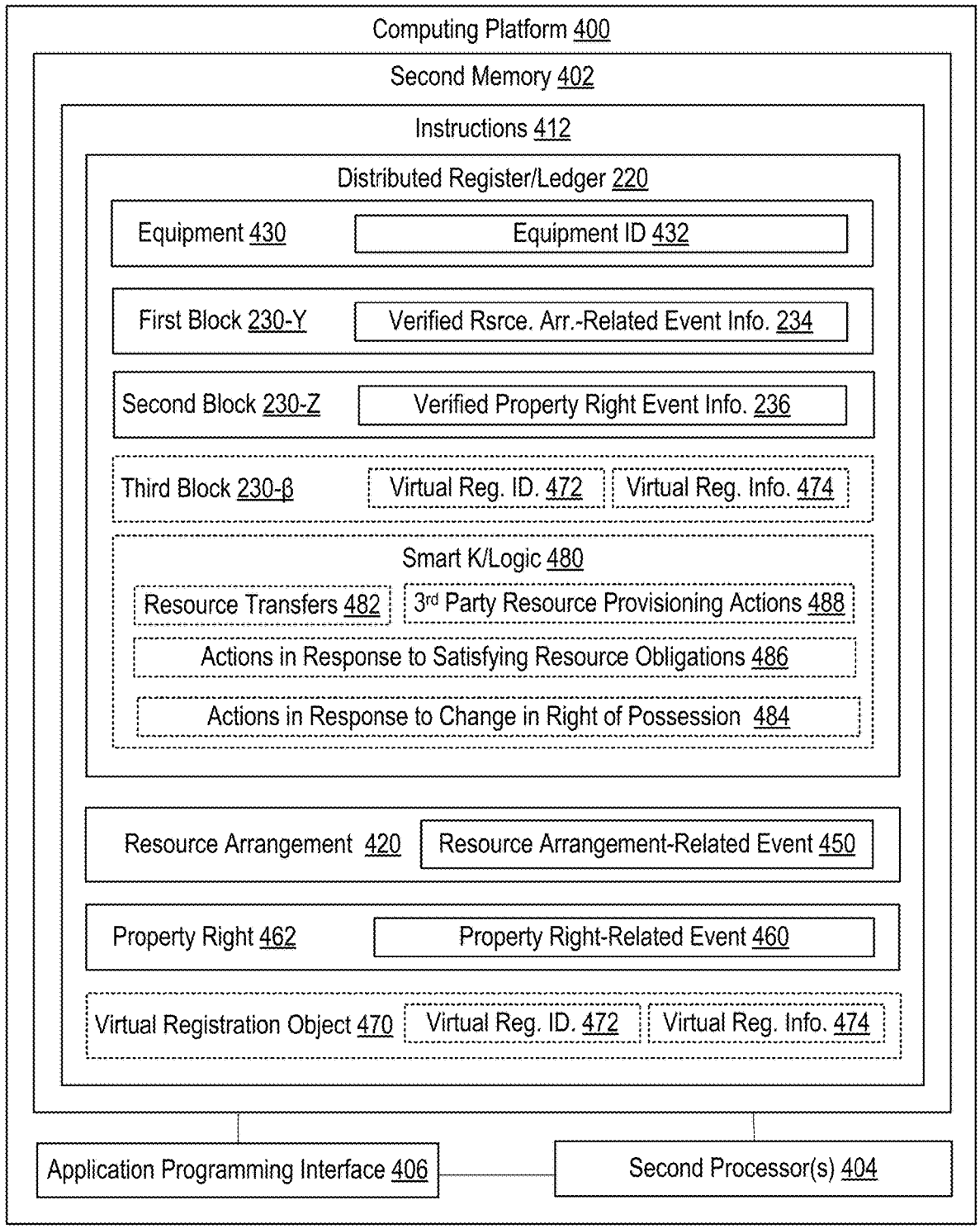
Figure 7:
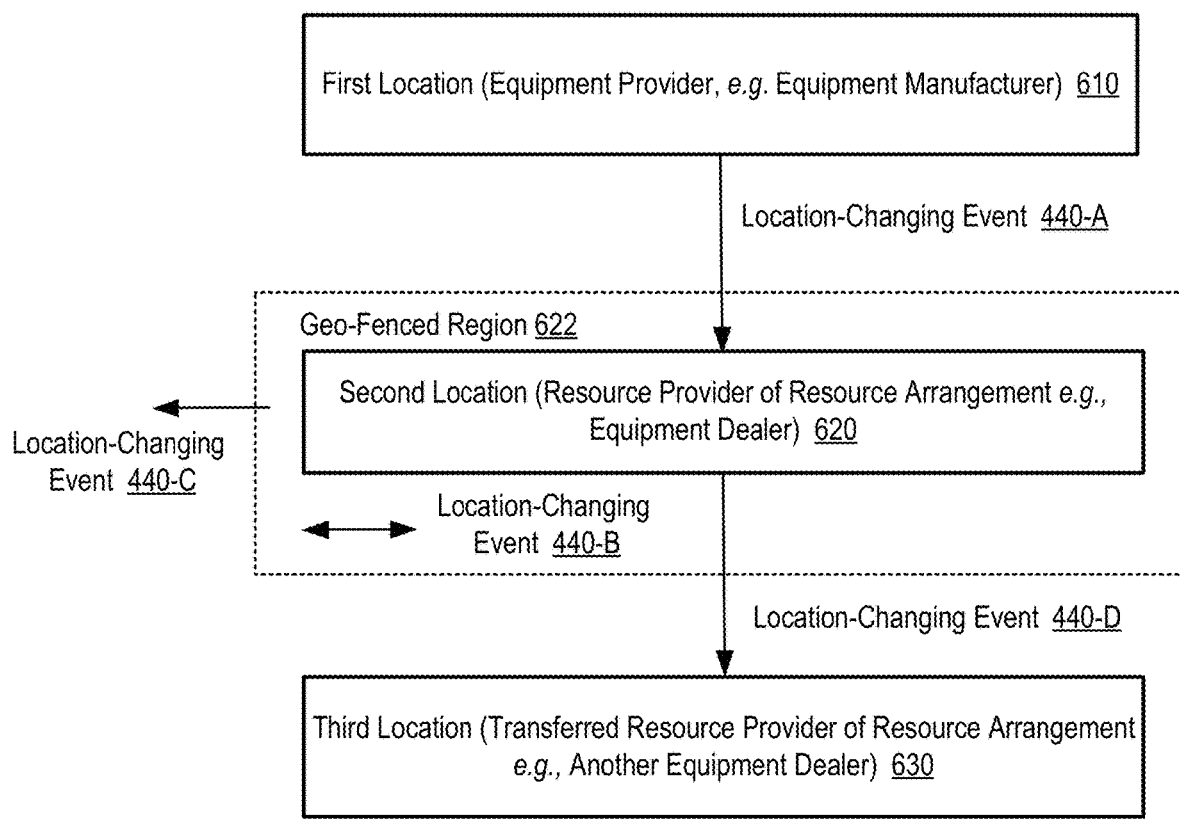
Figure 8:
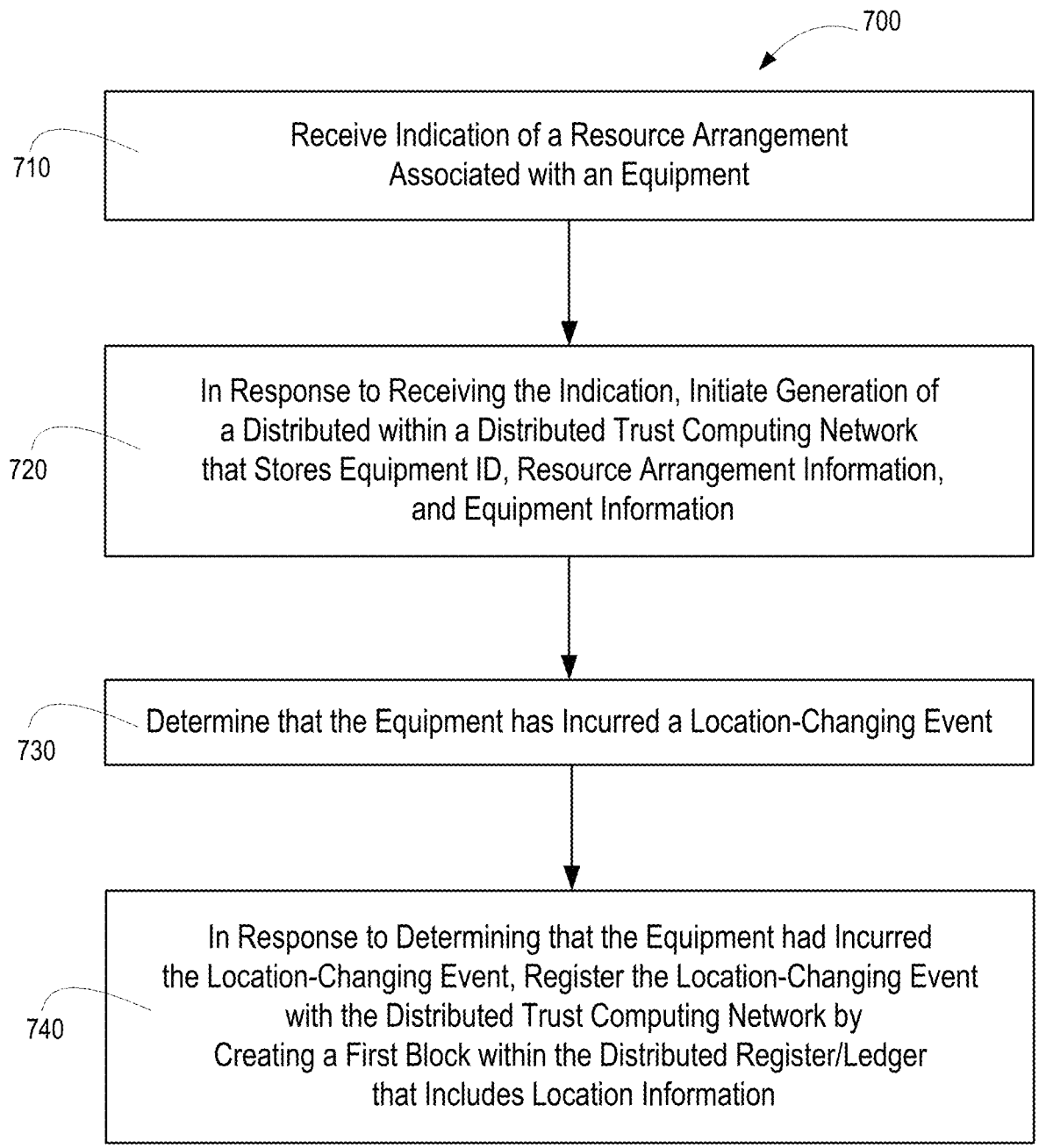
Figure 9:
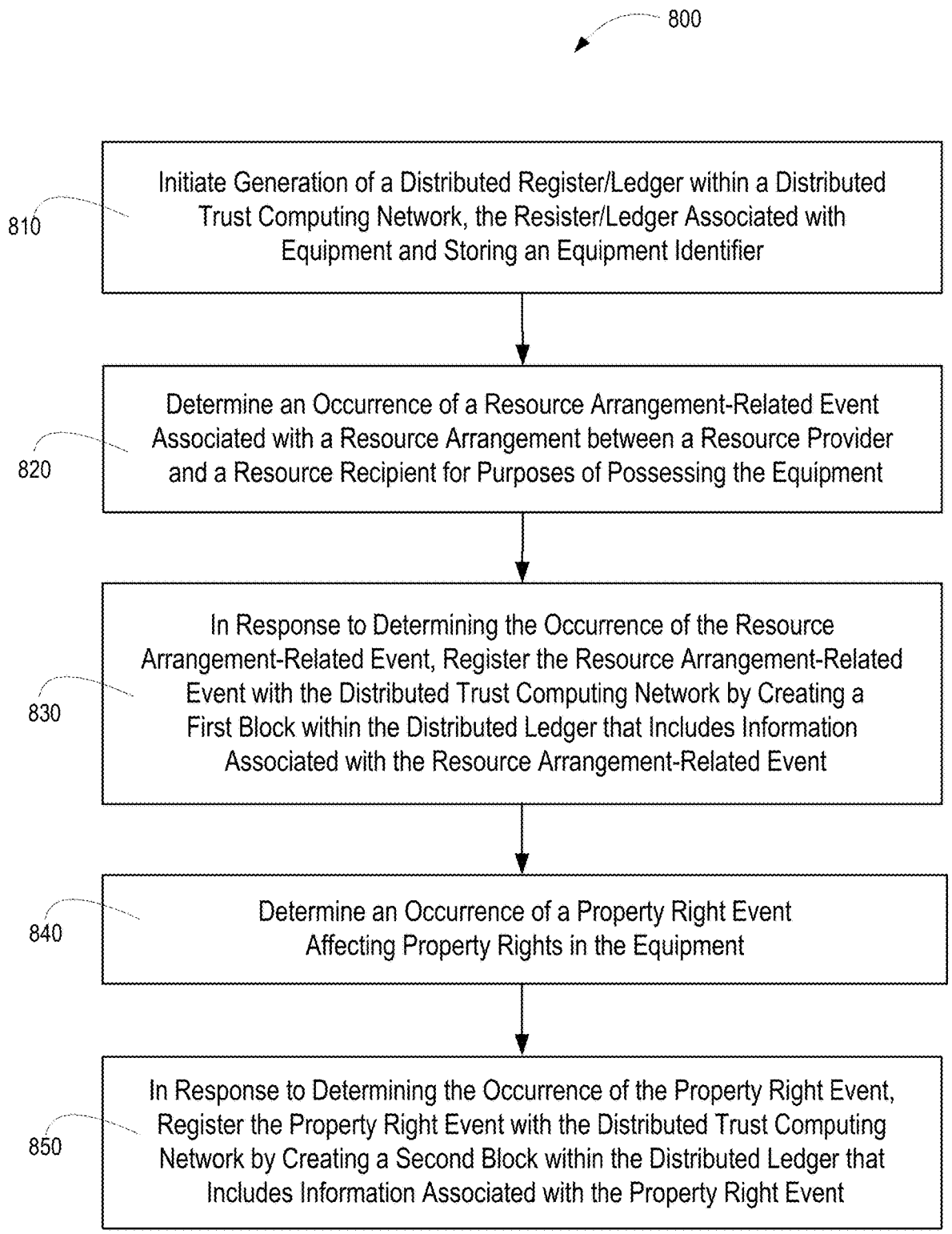

Having thus described embodiments of the disclosure in general terms, reference will now be made to the accompanying drawings, wherein:

FIG. 1 is a schematic diagram of a system for validating tracking of events associated with equipment during a resource arrangement, in accordance with some embodiments of the present invention;

FIG. 2 is a schematic diagram of a system for validating tracking and managing of events associated with equipment during a usage lifetime, in accordance with some embodiments of the present invention;

FIG. 3 is a schematic diagram of a distributed trust computing network, in accordance with embodiments of the present invention;

FIG. 4 is a schematic diagram of systems of the present invention highlighting various entities being provided access to data stored on the distributed register/ledger, in accordance with embodiments of the present invention;

FIG. 5 is a block diagram of a computing platform configured for validated tracking of events associated with equipment during a resource arrangement, in accordance with some embodiments of the present invention;

FIG. 6 is a block diagram of a computing platform configured for validated tracking and managing of events associated with equipment during a usage lifetime, in accordance with some embodiments of the present invention;

FIG. 7 is schematic/flow diagram illustrating various exemplary location-changing events incurred by equipment, in accordance with embodiments of the present invention;

FIG. 8 is a flow diagram of a method for validating tracking of events associated with equipment during a resource arrangement, in accordance with some embodiments of the present invention; and FIG. 9 is flow diagram of a method for validating tracking and managing of events associated with equipment during a usage lifetime, in accordance with some embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++, PYTHON or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

Thus, according to embodiments of the invention, which will be described in more detail below, systems, methods and computer program products are disclosed for validated tracking of events associated with equipment during the course of a resource arrangement. In specific embodiments of the invention, the events include location-changing events, which provide for a physical change in location of the equipment. The verified tracking of the events is provided by a distributed trust computing network, which through convergence by one or more decentralized nodes provides for authenticating/validating data stored within distributed registers/ledgers. Therefore, once a location-changing event is determined/detected, the location-changing event is registered in the distributed trust computing network by creating and validating a data block within a distributed register/ledger that includes information pertaining to the location-changing event. In this regard, the existence of the data block within the distributed register/leger serves as a verified source of truth of the occurrence of the location-change event, which is capable of identifying the verified current location of the equipment at any point in time.

Further, in specific embodiments, the invention is further capable of tracking other events associated with the equipment, such as resource arrangement-related events and the like. For example, the invention may track the occurrence of a change in property rights (e.g., tile transfer) associated with the equipment and register the event in the distributed register/ledger. Further, the distributed ledger may be configured with logic that recognizes the event and, in response, performs one or more predetermined actions (e.g., satisfying outstanding obligations associated with the resource arrangement or the like).

Moreover, embodiments of the present invention are able to provide access to the validated information stored on the distributed register/ledger to a plurality of different entities on a need-to-know basis. In this regard, designated entities may be provided access to limited portions (i.e., specified data blocks) of the distributed register/ledger based on system operator selection.

Referring to FIG. 1, a block diagram is presented of a system 100 for validated tracking of equipment during a resource arrangement, in accordance with embodiments of the present invention. The system 100 includes a distributed trust computing network 200 as described in more detail infra. in relation to FIG. 3. The distributed trust computing network 200 includes a plurality of decentralized nodes 210. Each decentralized node 210 having a first memory (not shown in FIG. 1) and at least one first processor (not shown in FIG. 1) in communication with the first memory. The first memory of the decentralized nodes 210 is configured to store at least a portion of a distributed register/ledger 220 that includes a plurality of blocks 230-1-230-4. The processors of distributed trust computing network 200 are configured to certify/validate that the data in the blocks 230-1-230-4 is, valid, authentic and unaltered.

The system 100 additionally includes a computing platform 400 disposed within a distributed communication network 300, such as the Internet and/or intranets. The computing platform 400 may comprise one or more computing devices, for example server(s) or the like. In specific embodiments of the system, the computing platform 400 is under the control of a trusted entity, such as a financial institution, government agency or the like. The computing platform 400 includes a second memory 402 and at least one second processor 404 in communication with the second memory 402.

The second memory stores instructions 410 that are executable by second processor 404. The instructions 410 are configured to receive indication/notification of resource arrangement 420 associated with equipment 430. Equipment 430 as used herein includes any financed and moveable property, such as, but not limited to, automobiles, recreational vehicles, boats, industrial equipment, machinery or the like. In specific embodiments of the invention, equipment 430 is an inventory or portfolio of vehicles financed by a lending entity, such as a financial institution (otherwise referred to herein as the resource provider) and in possession of a resale entity, such as automobile dealer (otherwise referred to herein as the equipment possessor).

A resource arrangement 420420 as used herein is a financing agreement between a lender (e.g., resource provider) and an equipment possessor (e.g., a vehicle dealer or the like). In specific embodiments of the invention, in which the equipment 430 is an inventory of vehicles, the resource arrangement 420 includes a demand note issued by the lender to the vehicle dealer with the inventory of vehicles serving as collateral. In such embodiments of the invention, each unit of inventory (i.e., each separate vehicle) has a separate contract that defines the financing obligations and rights of the lending entity and the dealer.

In response to the indication/notification, the instructions 410 are further configured to initiate generation of a distributed/register ledger 220 stored within the nodes 210 of the distributed trust computing network 200. The distribute register/ledger 220 stores an equipment identifier (ID) 432 that serves to identify the equipment throughout the usage duration of the equipment. For example, in those embodiments in which the equipment is a vehicle/automobile, the equipment identifier may be the Vehicle Identification Number (VIN), which denotes, where the vehicle was built, the manufacturer, the brand, type of the vehicle, the model year of the vehicle, the plant at which the vehicle was assembled and a unique serial number for the vehicle. In addition, the distributed ledger 220 stores other equipment information 434 and resource arrangement information 422.

In addition, the instructions 410 are configured to determine or otherwise detect that the equipment 430 has incurred a location-changing event 440. A location-changing event 440 is any movement of the equipment 430 deemed to be significant enough to warrant verification. As previously discussed, various entities, such as, for example, the resource provider in the resource arrangement (i.e., the financing entity) or an indemnification/insurer may have the need to verify the existence/location of equipment 430 during the life of the resource arrangement without having to physically visit the location at which the equipment 430 is purported to be located at. In specific embodiments of the invention, location-changing events 440, which may be predefined by the instruction provider/implementer, may be determined/detected based one or more of transportation data associated with the equipment 430, electronic communication with the GPS-configured equipment 430, tracking devices/sensors on the equipment 430 (e.g., Onboard Diagnostics (OBD) or the like) or any other known or future known means for detecting movement of the equipment 430. In those embodiments of the invention in which the equipment 430 includes GPS sensors or other location sensing mechanisms and network connectivity the equipment provides Internet-of-Things (IOT)-type communication with the system 100 in order to provide real-time location information to instructions 410. In response to determining/detecting the location-changing event 440, the location-changing event 440 is registered within the distributed trust computing network 200 by creating a first data block 230-X within the distributed register/ledger 220 that includes information associated with the location-changing event 440 (e.g., origin, destination, route, current location and the like). By registering the location-changing event 440 within the distributed register/ledger 220 of the distributed trust computing network 200 authenticity (i.e., truthfulness, veracity) of the location-changing event is verified. As a result, entities, such as financing parties to the financing agreement or insurers) who desire accurate verified information regarding equipment location, can access the distributed trust computing network as a source of truth as to the equipment's location.

Referring to FIG. 2 a block diagram is presented of a system 110 for validated tracking and managing of events associated with equipment during a usage lifetime, in accordance with embodiments of the present invention. Similar to the system 100 shown in FIG. 1, the system 100 includes a distributed trust computing network 200 as described in more detail infra. in relation to FIG. 3. The distributed trust computing network 200 includes a plurality of decentralized nodes 210. Each decentralized node 210 having a first memory (not shown in FIG. 2) and at least one first processor (not shown in FIG. 2) in communication with the first memory. The first memory of the decentralized nodes 210 is configured to store at least a portion of a distributed register/ledger 220 that includes a plurality of blocks 230-1-230-4. The processors of distributed trust computing network 200 are configured to certify/validate that the data in the blocks 230-1-230-4 is, valid, authentic and unaltered.

The system 100 additionally includes a computing platform 400 disposed within a distributed communication network 300, such as the Internet and/or intranets. The computing platform 400 may comprise one or more computing devices, for example server(s) or the like. In specific embodiments of the system, the computing platform 400 is under the control of a trusted entity, such as a financial institution, government agency or the like. The computing platform 400 includes a second memory 402 and at least one second processor 404 in communication with the second memory 402.

The second memory stores instructions 412 that are executable by second processor 404. The instructions 412 are configured to initiate generation of a distributed register/ledger 220 stored within nodes 210 of the distributed trust computing network 200 that is associated with equipment 430. The distributed register/ledger 220 stores, at a minimum, an equipment identifier (ID) 432. The equipment 430 may be any financed and movable property, such as, but not limited to, automobile(s), recreational vehicle(s), boat(s), industrial equipment, machinery or the like. The equipment identifier (ID) 432 that serves to identify the equipment throughout the usage duration of the equipment. For example, in those embodiments in which the equipment is a vehicle/automobile, the equipment identifier may be the Vehicle Identification Number (VIN), which denotes, where the vehicle was built, the manufacturer, the brand, type of the vehicle, the model year of the vehicle, the plant at which the vehicle was assembled and a unique serial number for the vehicle. In this regard, the equipment ID 432 acts a virtual birth certificate within the distributed ledger that authenticates the equipment and its origin. The initiation of the distributed register/ledger 220 may be in response to the manufacture of the equipment or in response to a resource arrangement, such as a financing agreement between a finance provider (e.g., a lending or financial institution) and an equipment holder/finance recipient (e.g., an equipment dealer, the equipment/vehicle buyer or lessee or the like).

In addition, the instructions 412 are configured to determine or otherwise detect an occurrence of a resource arrangement-related event 450 associated with a resource arrangement 420 (shown in FIG. 1). In specific embodiments of the invention, the resource arrangement 420 is a financing agreement/loan between a financing entity and an equipment holder/possessor (e.g., an equipment vehicle dealer, an equipment buyer/lessee or the like). For example, the resource arrangement 420 may include, but is not limited to, a consumer loan between a financing entity and an equipment buyer/lessee or a financing agreement (e.g., demand note or the like) between a financing entity and an equipment dealer that covers an inventory of vehicles. The resource-arrangement-related event may be transfer of resources (e.g., a payment) tied to the resource arrangement 420 or the like. In response to determining/detecting the resource arrangement-related event 450, the resource arrangement-related event 450 is registered within the distributed trust computing network 200 by creating a first data block 230-Y within the distributed register/ledger 220 that includes information associated with the resource arrangement-related event 440 (e.g., resource transfer type, data, amount and the like).

The second memory stores instructions 412 that are executable by second processor 404. The instructions 412 are configured to initiate generation of a distributed register/ledger 220 stored within nodes 210 of the distributed trust computing network 200 that is associated with equipment 430. The distributed register/ledger 220 stores, at a minimum, an equipment identifier (ID) 432. The equipment 430 may be any financed and movable property, such as, but not limited to, automobile(s), recreational vehicle(s), boat(s), industrial equipment, machinery or the like. The equipment identifier (ID) 432 that serves to identify the equipment throughout the usage duration of the equipment. For example, in those embodiments in which the equipment is a vehicle/automobile, the equipment identifier may be the Vehicle Identification Number (VIN), which denotes, where the vehicle was built, the manufacturer, the brand, type of the vehicle, the model year of the vehicle, the plant at which the vehicle was assembled and a unique serial number for the vehicle. In this regard, the equipment ID 432 acts a virtual birth certificate within the distributed ledger that authenticates the equipment and its origin. The initiation of the distributed register/ledger 220 may be in response to the manufacture of the equipment or in response to a resource arrangement, such as a financing agreement between a finance provider (e.g., a lending or financial institution) and an equipment holder/finance recipient (e.g., an equipment dealer, the equipment/vehicle buyer or lessee or the like).

By registering the resource arrangement-related event 450 and the property right-related event 460 within the distributed register/ledger 220 of the distributed trust computing network 200 authenticity (i.e., truthfulness, veracity) of the resource arrangement-related event 450 and the property right-related event 460 is realized. As a result, entities, such as financing parties to the financing agreement or insurers) who desire accurate verified information regarding financing agreements, property rights and the like, can access the distributed trust computing network as a source of truth as to the status of the financing agreement and the property's rights.

FIG. 3 is a schematic diagram of an exemplary distributed trust computing network 200, in accordance with embodiments of the present invention. The distributed trust computing network 200, in other instances referred to a blockchain network, is a distributed database that maintains, e.g., a list of data records, or the like. In specific embodiments of the invention the data records may include universal tags linked to data files, which are verified by the distributed trust computing network in terms of (i) the authenticity of the data file, and/or (ii) the user associated with the data file (e.g., rightful possessor and/or creator of the digital file). The security of the data maintained within the trust network is enhanced by the distributed nature of the network. The distributed trust computing network 200 typically includes several decentralized nodes 210, which may be one or more systems, machines, computers, databases, data stores or the like operably connected with one another. In some instances, each of the nodes 210 or multiple nodes 210 are maintained by different entities. A distributed trust computing network 200 typically works without a central repository or single administrator.

A distributed trust computing network 200 provides numerous advantages over traditional storage networks/databases. A large number of the decentralized nodes 210 of a trust network may reach a consensus regarding the validity of resources or data maintained with a block of the distributed trust computing network, in the context of the present invention the validity of the location-changing events of equipment maintained on a distributed register/ledger 220 or the like. Additionally, when multiple different suspected location-changing events of the equipment exist on the distributed register/ledger 220, multiple decentralized nodes 210 can converge on the most recent location-changing event, such that the most recent location-changing event is verified and reflects the current location of the equipment. For example, in the case of equipment location, any decentralized node 210 within the distributed trust computing network 200 that stores a record, such as location-changing event record, can determine within a level of certainty whether the record can be authenticated/verified and become final by confirming that no conflicting records are confirmed by the distributed trust computing network 200 elsewhere.

The distributed trust computing network 200 typically has two primary types of records. The first type is the record type, which consists of the actual data stored in a block 230 (shown in FIGS. 1 and 2) within a distributed register/ledger 220. The second type is the block type, which are records that confirm when and in what sequence certain events became recorded as part of the distributed trust computing network. Records, such as a location-changing event records, and the events associated therewith are created by participants using the distributed trust computing network in its normal course of business, for example, when a location-changing event is determined/detected, a data block(s) 230 is created by users known as "miners" who use specialized software/equipment to create data blocks 230. Holders (also, referred to as users) of a store block 130 of the distributed trust computing network agree to store the data block 230 within the distributed trust computing network 200 and the related data clocks 230 are passed around to various nodes 210 of the distributed trust computing network 200. A "valid" data block 230 or related event is one that can be validated based on a set of rules that are defined by the particular system implementing the distributed trust computing network 100. For example, in the case of location-change events, a valid data block is one that authenticates data in the data block to which it is linked and/or the user/creator/owner of the data block and authorizes specific predetermined entities to access at least a portion of the distributed register/ledger 220 to gain access to the data contained in the data block 230.

A distributed trust computing network 200 is typically decentralized—meaning that a distributed register/ledger 220 (i.e., a decentralized register/ledger) is maintained on multiple nodes 210 of the distributed trust computing network 200. In this regard, one node 210 in the distributed trust computing network 200 may have a complete or partial copy of the entire distributed register/ledger 220 or set of records and/or blocks 230 on the distributed trust computing network 200. Events are initiated at a node 210 of a distributed trust computing network 200 and communicated to the various other nodes 210 of the distributed trust computing network 200. Any of the nodes 210 can validate the content of a data block 230 or an associated event, add the data block 230 and/or the contents of the data block 230 to its copy of the distributed register/ledger 220, and/or broadcast the detail/data of the data block 230, its associated validation (in the form of a block 230) and/or other data to other nodes 210. The distributed trust computing network 200 shown in FIG. 3 is configured to perform one or more of the steps or functions performed by the system shown in FIGS. 1 and 2, the computing platform shown in FIGS. 5 and 6 and the methods described by FIGS. 8 and 9.

Referring to FIG. 4 a schematic diagram is presented of systems 100 and 110 that details the accessing of data stored in the distributed register ledger 220 to various different entities. It should be noted that the system operator entity 500 in control of computing platform 400 can control who has access to the distributed ledger 220 and what portions of the distributed ledger (e.g., which data blocks 230-1 or the like) the accessing entities are authorized to access. In this regard, system instruction may provide rules as what types of data an entity may access, when an entity may access and other access-type restrictions. In this regard, some of the authorized entities may be provided access to the entire distributed register/ledger 220 while other accessing entities may be provided access to only specified predetermined portions of the distributed register/ledger 220. In the illustrated embodiment of FIG. 4 the accessing entities are provided access to the distributed register/ledger 220 and, more specifically, the distributed trust computing network 200 via a distributed communication network 300, such as the Internet and/or one or more intranets or the like. Further, according to the illustrated embodiments of FIG. 4 access to at least a portion of the distributed ledger is provided to the resource provider 510 (e.g., the financing entity) in the resource arrangement (e.g. finance agreement). In this regard, the resource provider 510 may access the distributed register/ledger 220 to verify the location of equipment that they have provided resources for (i.e., financed). For example, verify that the equipment is located at a dealer site and, in some instances the specific location within the dealer site. In addition, the resource provider 510 may access the distributed register/ledger 220 to verify proper chain of title and/or the occurrence of resource transfers (e.g., payments or the like) pertaining to the resource arrangement (e.g., financing agreement). In addition, in the event that the resource provider 510 transfers the resource arrangement, in whole or part, to another resource provider or entity, the other resource provider or entity may assume, in whole or part, the access privileges that were proved to the resource provider 510.

In addition, according to specific embodiments of the invention, access to at least a portion of the distributed ledger is provided to an equipment indemnifier 520 (e.g., an insurance company) to verify the existence/location of the equipment and the like. Moreover, in accordance with other specific embodiments of the invention, access to at least a portion of the distributed register/ledger 220 is provided to the resource recipient 530 (e.g., equipment holder/buyer/lease or the like) in the resource arrangement (e.g., financing agreement) to verify a chain in title of the equipment, or, those in embodiments in which the resource recipient is an equipment dealer to manage their respective inventory of equipment at the dealer lot or the like. It should be noted that the systems 100 and 110 provide for other entities to be provided access to at least a portion of the distributed register/ledger 220 as circumstances dictate.

Referring to FIG. 5 a block diagram is depicted of the computing platform 400 configured for validated tracking of events associated with equipment during a resource arrangement, in accordance with embodiments of the present invention. Computing platform 400, which comprise one or more computing devices (e.g., personal computers, servers or the like), is configured to execute instructions 410, such as algorithms, modules, routines, applications and the like. Computing platform 400 includes second memory 402, which may comprise volatile and non-volatile memory, such as read-only and/or random-access memory (RAM and ROM), EPROM, EEPROM, flash cards, or any memory common to computing platforms). Moreover, second memory 402 may comprise cloud storage, such as provided by a cloud storage service and/or a cloud connection service.

Further, computing platform 400 also includes at least one second processor 404, which may be an application-specific integrated circuit ("ASIC"), or other chipset, logic circuit, or other data processing device. Second processor 404 may execute one or more application programming interface (APIs) 406 that interfaces with any resident programs, such as instructions 410 or the like, stored in the second memory 402 of the computing platform 400 and any external programs. Second processor 404 may include various processing subsystems (not shown in FIG. 5) embodied in hardware, firmware, software, and combinations thereof, that enable the functionality of computing platform 400 and the operability of the computing platform 400 on the distributed computing network 300 (shown in FIGS. 2 and 3). For example, processing subsystems allow for initiating and maintaining communications and exchanging data with other networked devices. For the disclosed aspects, processing subsystems of second processor 404 may include any subsystem used in conjunction with instructions 410 and related tools, routines, sub-routines, algorithms, sub-algorithms, sub-modules thereof.

Computing platform 400 may additionally include a communications module (not shown in FIG. 5) embodied in hardware, firmware, software, and combinations thereof, that enables electronic communications between the computing platform 400 and other network devices, such as those shown in FIGS. 1, 2 and 4. Thus, communication module may include the requisite hardware, firmware, software and/or combinations thereof for establishing and maintaining a network communication connection with one or more distributed trust.

Second memory 402 of computing platform 400 stores instructions 410 that are executable by second processor(s) 404 and configured to receive indication/notification of resource arrangement 420 associated with equipment 430. The equipment 430 may be any financed and moveable property, such as, but not limited to, automobiles, recreational vehicles, boats, industrial equipment, machinery or the like. As previously discussed, in specific embodiments of the invention, equipment 430 is an inventory or portfolio of vehicles financed by a lending entity, such as a financial institution (otherwise referred to herein as the resource provider) and in possession of a resale entity, such as automobile dealer (otherwise referred to herein as the equipment possessor).

In specific embodiments of the invention, the resource arrangement 420 is a financing agreement between a lender (e.g., resource provider) and an equipment possessor (e.g., a vehicle dealer or the like). In specific embodiments of the invention, in which the equipment 430 is an inventory of vehicles, the resource arrangement 420, includes a demand note issued by the lender to the vehicle dealer with the inventory of vehicles serving as collateral. In such embodiments of the invention, each unit of inventory has a separate contract that defines the financing obligations and rights of the lending entity and the dealer for a particular vehicle.

In response to the indication/notification, the instructions 410 are further configured to initiate generation of a distributed register/ledger 220 stored within the nodes 210 of the distributed trust computing network 200. The distribute register/ledger 220 stores an equipment identifier (ID) 432 that serves to identify the equipment throughout the usage duration of the equipment. For example, in those embodiments in which the equipment is a vehicle/automobile, the equipment identifier may be the Vehicle Identification Number (VIN), which denotes, where the vehicle was built, the manufacturer, the brand, type of the vehicle, the model year of the vehicle, the plant at which the vehicle was assembled and a unique serial number for the vehicle. In addition, the distributed ledger 220 stores other equipment information 434 and resource arrangement information 422.

In addition, the instructions 410 are configured to determine or otherwise detect that the equipment 430 has incurred a location-changing event 440. A location-changing event 440 is any movement of the equipment 430 deemed to be significant enough to warrant verification.

Referring to FIG. 7 a schematic/flow diagram 600 is presented of various different location-changing events 440, in accordance with embodiments of the present invention. A location-changing event 440-A comprises transport/movement of the equipment from a first location 610 associated with an equipment provider, such an equipment manufacturer to a second location 620 associated with a resource recipient of the resource arrangement or a holder/possessor of the equipment, such as an equipment dealer. In other words, location-changing event 440-A entails transport of the equipment from the manufacturer location to a dealer location/lot. The second location 620 may comprise a geo-fenced region 622 defined by the perimeter of the equipment dealer location/lot or the like. In specific embodiments of the invention, location-changing event 440-B includes transport/movement of the equipment within the geo-fenced region 622 (e.g., movement within the equipment dealer location/lot), while in other embodiments of the invention, location-changing event 440-C includes transport/movement of the equipment outside of the geo-fenced region 622 (e.g., movement off of the equipment dealer location/lot, such as test drive of a vehicle or the like). In further embodiments of the invention, location-changing event 440-D includes movement of the equipment from the second location 620 associated with the resource recipient of the resource arrangement (e.g., equipment dealer lot or the like) to a third location 630 associated with a transferred resource recipient of the resource arrangement (e.g., another equipment dealer lot to which the equipment/vehicle along with, in some embodiments, the resource arrangement is being transferred). For example, in certain instances vehicles are swapped or exchanged amongst vehicle dealers for pending sales of a specified vehicle.

As previously discussed, various entities, such as, for example, the resource provider in the resource arrangement (i.e., the financing entity) or an indemnification/insurer may have the need to verify the existence/location of equipment 430 during the life of the resource arrangement without having to physically visit the location at which the equipment 430 is purported to be located at. In specific embodiments of the invention, location-changing events 440, which may be predefined by the instruction provider/implementer, may be determined/detected based one or more of transportation data associated with the equipment 430, electronic communication with the GPS-configured equipment 430, tracking devices/sensors on the equipment 430 (e.g., Onboard Diagnostics (OBD) or the like) or any other known or future known means for detecting movement of the equipment 430. In those embodiments of the invention in which the equipment 430 includes GPS sensors or other location sensing mechanisms and network connectivity the equipment provides Internet-of-Things (IOT)-type communication in order to provide real-time information in response to a location-changing event 440. In response to determining/detecting the location-changing event 440, the location-changing event 440 is registered within the distributed trust computing network 200 by creating a first data block 230-X within the distributed register/ledger 220 that includes verified location information 232 associated with the location-changing event 440 (e.g., origin, destination, route, current location and the like). By registering the location-changing event 440 within the distributed register/ledger 220 of the distributed trust computing network 200 authenticity (i.e., truthfulness, veracity) of the location-changing event 440 is verified. As a result, entities, such as financing parties to the financing agreement or insurers) who desire accurate verified information regarding equipment location, can access the distributed trust computing network as a source of truth as to the equipment's location.

In other specific embodiments of the invention, the instructions 410 are further configured to determine/detect resource arrangement-related events 450 associated with the resource arrangement 420. The resource arrangement-related events may include a resource transfer 452 (e.g., a payment from the resource recipient to the resource provider) or a title transfer 454. In response to determining/detecting the resource arrangement-related event 450, the resource arrangement-related event 450 is registered within the distributed trust computing network 200 by creating a second data block 230-Y within the distributed register/ledger 220 that includes verified resource arrangement-related event data information 234 associated with the resource arrangement-related event 450. By registering the resource arrangement-related event 450 within the distributed register/ledger 220 of the distributed trust computing network 200 authenticity (i.e., truthfulness, veracity) of the resource arrangement-related event 450 is verified.

In related embodiments of the invention, the distributed register/ledger 220 may include logic 240, otherwise referred to as a smart contract that is configured to perform actions in response to predetermined events. In specific embodiments of the invention the event may be detection of a resource arrangement-related event 450, such as title transfer 454, which signifies that equipment under a resource arrangement has been conveyed to another entity (i.e., sold, leased or the like). In specific embodiments of the invention, the resource arrangement-related event 450 is a title transfer between resource providing entities (i.e., financing entities) or between a resource providing entity (i.e., financing entity) and a consumer buyer in response to the equipment dealer selling equipment/a vehicle to an equipment buyer. In such embodiments of the invention, the dealer is released from the security interest in the equipment under the demand note. In such embodiments of the invention, the action that is performed may include, but is not limited to, completing obligations 242 associated with the outstanding resource arrangement (e.g., automatic transfer of funds to the resource provider (e.g., financing entity) to complete obligations under the resource arrangement (i.e., financing agreement)) and generation of documentation 244 associated with resource arrangement-related event 450 and registration of such documentation 244 on the distributed register/ledger 220 and/or initiation of communication of such documentation 244 to one or more designated third-party entities. In addition, in those embodiments of the invention in which the resource arrangement-related event 450 is the sale or lease of the equipment by the equipment possessor (e.g., vehicle dealer or the like), the distributed register/ledger 220 associated with the particular equipment (e.g., specific vehicle) may be closed off from further entries/data blocks and/or access to the distributed register/ledger 220 may be denied or limited to the previous equipment possessor (e.g., the vehicle dealer that sold or leased the vehicle).

Referring to FIG. 6 a block diagram is depicted of the computing platform 400 configured for validated tracking and managing of events associated with equipment during a usage lifetime, in accordance with embodiments of the present invention. Computing platform 400, which comprise one or more computing devices (e.g., personal computers, servers or the like), is configured to execute instructions 410, such as algorithms, modules, routines, applications and the like. Computing platform 400 includes second memory 402, which may comprise volatile and non-volatile memory, such as read-only and/or random-access memory (RAM and ROM), EPROM, EEPROM, flash cards, or any memory common to computing platforms). Moreover, second memory 402 may comprise cloud storage, such as provided by a cloud storage service and/or a cloud connection service.

Further, computing platform 400 also includes at least one second processor 404, which may be an application-specific integrated circuit ("ASIC"), or other chipset, logic circuit, or other data processing device. Second processor 404 may execute one or more application programming interface (APIs) 406 that interfaces with any resident programs, such as instructions 410 or the like, stored in the second memory 402 of the computing platform 400 and any external programs. Second processor 404 may include various processing subsystems (not shown in FIG. 5) embodied in hardware, firmware, software, and combinations thereof, that enable the functionality of computing platform 400 and the operability of the computing platform 400 on the distributed computing network 300 (shown in FIGS. 2 and 3). For example, processing subsystems allow for initiating and maintaining communications and exchanging data with other networked devices. For the disclosed aspects, processing subsystems of second processor 404 may include any subsystem used in conjunction with instructions 410 and related tools, routines, sub-routines, algorithms, sub-algorithms, sub-modules thereof.

Computing platform 400 may additionally include a communications module (not shown in FIG. 6) embodied in hardware, firmware, software, and combinations thereof, that enables electronic communications between the computing platform 400 and other network devices, such as those shown in FIGS. 1, 2 and 4. Thus, communication module may include the requisite hardware, firmware, software and/or combinations thereof for establishing and maintaining a network communication connection with one or more distributed trust.

Second memory 402 of computing platform 400 stores instructions 412 that are executable by second processor(s) 404 and configured to initiate generation of a distributed register/ledger 220 stored within nodes 210 of the distributed trust computing network 200 that is associated with equipment 430. The distributed register/ledger 220 stores, at a minimum, an equipment identifier (ID) 432. The equipment 430 may be any financed and moveable property, such as, but not limited to, automobile, recreational vehicles, boats, industrial equipment, machinery or the like. The equipment identifier (ID) 432 that serves to identify the equipment throughout the usage duration of the equipment. For example, in those embodiments in which the equipment is a vehicle/automobile, the equipment identifier may be the Vehicle Identification Number (VIN), which denotes, where the vehicle was built, the manufacturer, the brand, type of the vehicle, the model year of the vehicle, the plant at which the vehicle was assembled and a unique serial number for the vehicle. In this regard, the equipment ID 432 acts a virtual birth certificate within the distributed ledger that authenticates the equipment and its origin. The initiation of the distributed register/ledger 220 may be in response to the manufacture of the equipment or in response to a resource arrangement, such as a financing agreement between a finance provider (e.g., a lending or financial institution) and an equipment holder/recipient (e.g., an equipment/vehicle dealer, an equipment/vehicle buyer or lessee or the like).

In addition, the instructions 412 are configured to determine or otherwise detect an occurrence of a resource arrangement-related event 450 associated with a resource arrangement 420. In specific embodiments of the invention, the resource arrangement 420 is a financing agreement/loan between a financing entity and an equipment holder/possessor (e.g., an equipment vehicle dealer, an equipment buyer/lessee or the like). For example, the resource arrangement 420 may include, but is not limited to, a consumer loan between a financing entity and an equipment buyer/lessee or a financing agreement (e.g., demand note or the like) between a financing entity and an equipment dealer that covers an inventory of vehicles. The resource-arrangement-related event may be transfer of resources (e.g., a payment) tied to the resource arrangement 420 or the like. In response to determining/detecting the resource arrangement-related event 450, the resource arrangement-related event 450 is registered within the distributed trust computing network 200 by creating a first data block 230-Y within the distributed register/ledger 220 that includes information associated with the resource arrangement-related event 440 (e.g., resource transfer type, data, amount and the like).

Further, the instructions are configured to determine or otherwise detect an occurrence of a property right-related event 460 affecting property rights 462 of the equipment 430. In specific embodiments of the invention, the property right-related event 460 is a transfer in title from a first party to a second party. In response to determining/detecting the property right-related event 460, the property right-related event 460 is registered within the distributed trust computing network 200 by creating a second data block 230-Z within the distributed register/ledger 220 that includes information associated with the property right-related event 440 (e.g., date of transfer or title, parties to the transfer and the like).

By registering the resource arrangement-related event 450 and the property right-related event 460 within the distributed register/ledger 220 of the distributed trust computing network 200 authenticity (i.e., truthfulness, veracity) of the resource arrangement-related event 450 and the property right-related event 460. As a result, entities, such as financing parties to the financing agreement or insurers) who desire accurate verified information regarding financing agreements, property rights and the like, can access the distributed trust computing network as a source of truth as to the status of the financing agreement and the property's rights.

In specific embodiments of the invention, instructions 412 are further configured to generate a virtual registration object 470 associated with the equipment 430, such as a virtual license plate, which includes a virtual registration identifier 472 and virtual registration information 474. In response to creating the virtual registration object 470, the instructions 412 are further configured to register the virtual registration object 470 within the distributed trust computing network 200 by creating a third data block 230-β within the distributed register/ledger 220 that includes the virtual registration identifier 472 and the virtual registration information 474. By registering the virtual registration object 470 within the distributed trust computing network 200 the registration object, such as a license plate stays without the equipment 430 throughout the usage life of the equipment 430 and registrations can be recorded in individual jurisdictions (i.e., states or the like) as the equipment is moved from one jurisdiction to another by the rightful possessor.

In additional embodiments of the invention, the instructions 412 are configured to generate and store within the distributed register/ledger 220 logic 480, otherwise referred to as smart contracts that are configured to perform one or more actions as a result of the distributed trust computing network verifying the occurrence of one or more triggering events. For example, in specific embodiments of the invention, logic 480 is stored in the distributed register/ledger 220 that is configured to execute a resource transfer 482 (e.g., payments or the like) in accordance with predetermined resource transfer requirements (e.g., resource transfer due date, title transfer or the like). In such embodiments of the invention, an occurrence of the predetermined resource transfer requirements is registered in the distributed trust computing network 200 by creating a data block within the distributed ledger 220 that includes requirements information. In response to registering the occurrence of the predetermined resource transfer requirements, the logic 480 is executed to perform the resource transfer 482.

In other specific embodiments of the invention, logic 480 is stored in the distributed register/ledger 220 that is configured to execute action(s) 484 in response in response to a change in right of possession (i.e., change in title or the like) of the equipment 430. In such embodiments of the invention, an occurrence of the change in right of possession is registered in the distributed trust computing network 200 by creating a data block within the distributed ledger 220 that includes change in right of possession information. In response to registering the occurrence the change in right of possession, the logic 480 is executed to perform the action(s) (e.g., payoff outstanding balance of the resource arrangement or the like).

In further specific embodiments of the invention, logic 480 is stored in the distributed register/ledger 220 that is configured to execute action(s) 486 in response in response to satisfying outstanding obligations of the resource arrangement (i.e., payoff the entirety of the resource arrangement or the like). In such embodiments of the invention, an occurrence of the satisfaction of the outstanding obligations of the resource arrangement is registered in the distributed trust computing network 200 by creating a data block within the distributed ledger 220 that includes satisfaction of the outstanding obligations of the resource arrangement information. In response to registering the occurrence the change in right of possession, the logic 480 is executed to perform the action(s) (e.g., transfer the title or the like).

In further specific embodiments of the invention, logic 480 is stored in the distributed register/ledger 220 that is configured to execute third-party resource provisioning action(s) 488 in response in response to a predetermined event. In such embodiments of the invention, an occurrence of the event is registered in the distributed trust computing network 200 by creating a data block within the distributed ledger 220 that includes event information. In response to registering the occurrence the event, the logic 480 is executed to perform the third-party resource provisioning action (e.g., transfer pf resource to the third-party). The predetermined events may include, but are not limited to an inspection/assessment of the equipment, a due data for registration associated with the equipment, a due date for insurance/indemnity premium on the equipment or the like, In addition to triggering, the resource provisioning, the logic 480 may be configured to perform other actions, such as communicating information to other third-parties or the like.

In further embodiment of the invention, the instructions 412 are configured to receive maintenance records related to maintenance, including upkeep or repair, performed on the equipment and, in response, register the maintenance event within the distributed trust computing network 200 by creating a data block within the distributed ledger 220 that includes maintenance-related information.

Referring to FIG. 8 a flow diagram is presented of a method 700 for validated tracking of events associated with equipment during a resource arrangement, in accordance with embodiments of the present invention. At Event 710, indication/notification of resource arrangement associated with equipment is received. The equipment may be any financed and moveable property, such as, but not limited to, automobiles, recreational vehicles, boats, industrial equipment, machinery or the like. In specific embodiments of the invention, equipment 430 is an inventory or portfolio of vehicles financed by a lending entity, such as a financial institution (otherwise referred to herein as the resource provider) and in possession of a resale entity, such as automobile dealer (otherwise referred to herein as the equipment possessor).

In specific embodiments of the invention, the resource arrangement is a financing agreement between a lender (e.g., resource provider) and an equipment possessor (e.g., a vehicle dealer or the like). In specific embodiments of the invention, in which the equipment 430 is an inventory of vehicles, the resource arrangement 420 includes a demand note issued by the lender to the vehicle dealer with the inventory of vehicles serving as collateral. In such embodiments of the invention, each unit of inventory (i.e., each separate vehicle) has a separate contract that defines the financing obligations and rights of the lending entity and the dealer.

In response to the receiving the indication/notification of the resource arrangement, at Event 720, generation of a distributed register/ledger associated with the equipment is stored a distributed trust computing network is initiated. The distribute register/ledger stores an equipment identifier (ID) that serves to identify the equipment throughout the usage duration of the equipment. For example, in those embodiments in which the equipment is a vehicle/automobile, the equipment identifier may be the Vehicle Identification Number (VIN), which denotes, where the vehicle was built, the manufacturer, the brand, type of the vehicle, the model year of the vehicle, the plant at which the vehicle was assembled and a unique serial number for the vehicle. In addition, the distributed ledger stores other equipment information and resource arrangement information.

At Event 730, a location-changing event incurred by the equipment is determined or otherwise detected. As previously discussed, a location-changing event is any movement of the equipment deemed to be significant enough to warrant verification. As previously discussed, various entities, such as, for example, the resource provider in the resource arrangement (i.e., the financing entity) or an indemnification/insurer may have the need to verify the existence/location of equipment during the life of the resource arrangement without having to physically visit the location at which the equipment is believed to be located. In specific embodiments of the invention, location-changing events, which may be predefined by the instruction provider/implementer, may be determined/detected based one or more of transportation data associated with the equipment, electronic communication with the GPS-configured equipment, tracking devices/sensors on the equipment (e.g., Onboard Diagnostics (OBD) or the like) or any other known or future known means for detecting movement of the equipment. Location-changing events may include but are, not limited to (i) physical movement of the equipment from a first location associated with an equipment provider to a second location associated with a resource recipient of the resource arrangement, (ii) physical movement of the equipment within a geo-fenced region defined by a location associated with a resource recipient of the resource arrangement, (iii) physical movement of the equipment outside of a geo-fenced region defined by a location associated with a resource recipient of the resource arrangement, and (iv) physical movement of the equipment from a first location associated with a first resource recipient of the resource arrangement to a second location associated with a transferred resource recipient of the resource arrangement.

In response to determining/detecting the location-changing event, at Event 740, the location-changing event is registered within the distributed trust computing network by creating a first data block within the distributed register/ledger that includes information associated with the location-changing event (e.g., origin, destination, route, current location and the like). By registering the location-changing event within the distributed register/ledger of the distributed trust computing network authenticity (i.e., truthfulness, veracity) of the location-changing event is verified. As a result, entities, such as financing parties to the financing agreement or insurers) who desire accurate verified information regarding equipment location, can access the distributed trust computing network as a source of truth as to the equipment's location.

Referring to FIG. 9 a flow diagram is depicted of a method 800 for validated tracking and managing of events associated with equipment during the usage lifetime, in accordance with embodiment of the present invention. At Event 810, generation of a distributed register/ledger associated with equipment is initiated and the register/ledger is stored within nodes of the distributed trust computing network. The distributed register/ledger stores, at a minimum, an equipment identifier (ID). The equipment may be any financed and moveable property, such as, but not limited to, automobile(s), recreational vehicle(s), boat(s), industrial equipment, machinery or the like. The equipment identifier (ID) that serves to identify the equipment throughout the usage duration of the equipment. For example, in those embodiments in which the equipment is a vehicle/automobile, the equipment identifier may be the Vehicle Identification Number (VIN), which denotes, where the vehicle was built, the manufacturer, the brand, type of the vehicle, the model year of the vehicle, the plant at which the vehicle was assembled and a unique serial number for the vehicle. In this regard, the equipment ID acts a virtual birth certificate within the distributed ledger that authenticates the equipment and its origin. The initiation of the distributed register/ledger may be in response to the manufacture of the equipment or in response to a resource arrangement, such as a financing agreement between a finance provider (e.g., a lending or financial institution)and an equipment holder/recipient (e.g., an equipment/vehicle dealer, the equipment/vehicle buyer or lessee or the like).

At Event 820, an occurrence of a resource arrangement-related event associated with a resource arrangement is determined or otherwise detected. In specific embodiments of the invention, the resource arrangement is a financing agreement/loan between a financing entity and an equipment holder/possessor (e.g., an equipment vehicle dealer, an equipment buyer/lessee or the like). For example, the resource arrangement may include, but is not limited to, a consumer loan between a financing entity and an equipment buyer/lessee or a financing agreement (e.g., demand note or the like) between a financing entity and an equipment dealer that covers an inventory of vehicles. The resource-arrangement-related event may be transfer of resources (e.g., a payment) tied to the resource arrangement or the like.

In response to determining/detecting the resource arrangement-related event, at Event 830, the resource arrangement-related event is registered within the distributed trust computing network by creating a first data block within the distributed register/ledger that includes information associated with the resource arrangement-related event (e.g., resource transfer type, data, amount and the like).

At Event 840, an occurrence of a property right-related event is determined or otherwise detected that affects property rights of the equipment. In specific embodiments of the invention, the property right-related event is a transfer in title from a first party to a second party. In response to determining/detecting the property right-related event, at Event 850, the property right-related event is registered within the distributed trust computing network by creating a second data block within the distributed register/ledger that includes information associated with the property right-related event (e.g., date of transfer or title, parties to the transfer and the like).

By registering the resource arrangement-related event and the property right-related event within the distributed register/ledger of the distributed trust computing network authenticity of the resource arrangement-related event and the property right-related event is realized. As a result, entities, such as financing parties to the financing agreement or insurers) who desire accurate verified information regarding financing agreements, property rights and the like, can access the distributed trust computing network as a source of truth as to the status of the financing agreement and the property's rights.

Thus, present embodiments of the invention provide for validated tracking of events associated with equipment during the course of a resource arrangement. In specific embodiments of the invention, the events include location-changing events, which provide for a physical change in location of the equipment. The verified tracking of the events is provided by a distributed trust computing network, which through convergence by one or more decentralized nodes provides for authenticating/validating data stored within distributed registers/ledgers. Therefore, once a location-changing event is determined/detected, the location-changing event is registered in the distributed trust computing network by creating and validating a data block within a distributed register/ledger that includes information pertaining to the location-changing event. In this regard, the existence of the data block within the distributed register/leger serves as a verified source of truth of the occurrence of the location-change event, which is capable of identifying the verified current location of the equipment at any point in time.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| Docket Number | U.S. Patent Application Ser. No. | Title | Filed On |
| --- | --- | --- | --- |
| 9642US1.014033.3673 | 16/831,342 | SYSTEM FOR VALIDATED TRACKING AND MANAGEMENT OF EVENTS ASSOCIATED WITH EQUIPMENT DURING LIFETIME USAGE | Mar. 26, 2020 |
| 9643US1.014033.3674 | 16/831,447 | SYSTEM FOR TRACKING A RESOURCE MAINTENANCE AND RESOURCE CAPABILITIES | Mar. 26, 2020 |
| 9644US1.014033.3675 | 16/831,467 | SYSTEM FOR TRACKING A RESOURCE PERFORMANCE AND MAINTENANCE | Mar. 26, 2020 |
| 9645US1.014033.3676 | 16/831,372 | SYSTEM FOR TRACKING RESOURCES WITH MULTIPLE USERS AND MULTIPLE LOCATIONS | Mar. 26, 2020 |

What is claimed is:

1. A system for validated tracking of events associated with equipment, the system comprising:
   a distributed trust computing network comprising a plurality of decentralized nodes, each decentralized node having a first memory and at least one first processing device in communication with the first memory, wherein the first memory of the decentralized nodes is configured to store a plurality of distributed registers, each distributed register comprising a plurality of blocks of data; and
   a computing platform disposed in a distributed computing network and including a second memory and at least one second processing device in communication with the second memory, wherein the second memory stores instructions executable by the at least one second processing device and configured to:
      receive indication of a resource arrangement associated with equipment;
      in response to receiving indication of a resource arrangement associated with an equipment, initiate generation of one of the plurality of distributed registers, wherein the distributed register stores an equipment identifier, resource arrangement information and equipment information,
         determine that the equipment has incurred a location-changing event,
         in response to determining that the equipment has incurred the location-changing event, register the location-changing event within the distributed trust computing network by creating a first block within the distributed register that includes information associated with the location-changing event,
      wherein the registering of the location-changing event within the distributed trust computing network provides for validating authenticity of the location-changing event.

2. The system of claim 1, wherein the instructions are further configured to:
   determine an occurrence of a resource arrangement-related event, and
   in response to determining the occurrence of the resource arrangement-related event, register the resource arrangement-related event with the distributed trust computing network by creating a second block within the distributed register that includes information associated with the resource arrangement-related event,
   wherein the registering of the resource arrangement-related event within the distributed trust computing network provides for validating authenticity of the resource arrangement-related event.

3. The system of claim 1, wherein the determining that the equipment has incurred the location changing-event further comprises receiving a signal, via the distributed communication network, location-changing event, from the equipment which includes a location-determining mechanism.

4. The system of claim 1, wherein the location-changing event is physical movement of the equipment from a first location associated with an equipment provider to a second location associated with a resource recipient of the resource arrangement.

5. The system of claim 1, wherein the location-changing event is physical movement of the equipment within a geo-fenced region defined by a location associated with a resource recipient of the resource arrangement.

6. The system of claim 1, wherein the location-changing event is physical movement of the equipment outside of a geo-fenced region defined by a location associated with a resource recipient of the resource arrangement.

7. The system of claim 1, wherein the location-changing event is physical movement of the equipment from a first location associated with a first resource recipient of the resource arrangement to a second location associated with a transferred resource recipient of the resource arrangement.

8. The system of claim 2, wherein the resource arrangement-related event is a transfer in title of the equipment from a resource recipient of the resource arrangement to a third-party entity.

9. The system of claim 8, wherein the instructions are further configured to, in response to the transfer of title, initiate a final resource transfer from the resource recipient to a resource provider of the resource arrangement to complete the resource arrangement.

10. The system of claim 8, wherein the instructions are further configured to, in response to the transfer of title, generate documentation associated with the transfer of title and register the documentation with the distributed trust computing network by creating a third block within the distributed register that includes information associated with the documentation.

11. The system of claim 1, wherein the instructions are further configured to provide a resource recipient of the resource arrangement access to at least a portion of the distributed register to verify a current location of the equipment.

12. The system of claim 1, wherein the instructions are further configured to provide an insurer of the equipment access to at least a portion of the distributer register to verify a current location of the equipment.

13. The system of claim 8, wherein the instructions are further configured to provide a resource provider associated with a second tier resource arrangement access to at least a portion of the distributed register to verify a chain of title in the equipment, wherein the second tier resource arrangement is conducted for purposed of the transfer in title.

14. A computer-implemented method for validated tracking of events associated with equipment, the method executed by one or more computer processor devices and comprising:
  receiving indication of a resource arrangement associated with equipment;
  in response to receiving indication of a resource arrangement associated with an equipment, initiating generation of a distributed register stored within nodes of a distributed trust computing network, wherein the distributed register stores an equipment identifier, resource arrangement information and equipment information;
  determining that the equipment has incurred a location-changing event;
  in response to determining that the equipment has incurred the location-changing event, registering the location-changing event within the distributed trust computing network by creating a first block within the distributed register that includes information associated with the location-changing event;
  wherein the registering of the location-changing event within the distributed trust computing network provides for validating authenticity of the location-changing event.

15. The computer-implemented method of claim 14, further comprising:
  determining an occurrence of a resource arrangement-related event; and
  in response to determining the occurrence of the resource arrangement-related event, registering the resource arrangement-related event with the distributed trust computing network by creating a second block within the distributed register that includes information associated with the resource arrangement-related event,
  wherein the registering of the resource arrangement-related event within the distributed trust computing network provides for validating authenticity of the resource arrangement-related event.

16. The computer-implemented method of claim 14, wherein the location-changing event is chosen from the group comprising of (i) physical movement of the equipment from a first location associated with an equipment provider to a second location associated with a resource recipient of the resource arrangement, (ii) physical movement of the equipment within a geo-fenced region defined by a location associated with a resource recipient of the resource arrangement, (iii) physical movement of the equipment outside of a geo-fenced region defined by a location associated with a resource recipient of the resource arrangement, and (iv) physical movement of the equipment from a first location associated with a first resource recipient of the resource arrangement to a second location associated with a transferred resource recipient of the resource arrangement.

17. The computer-implemented method of claim 15, wherein the resource arrangement-related event is a transfer in title of the equipment from a resource recipient of the resource arrangement to a third-party entity.

18. A computer program product comprising a non-transitory computer-readable medium including: a first set of codes for causing a computer processor to receive indication of a resource arrangement associated with equipment; a second set of codes for causing a computer processor to, in response to receiving indication of a resource arrangement associated with an equipment, initiate generation of a distributed register stored within nodes of a distributed trust computing network, wherein the distributed register stores an equipment identifier, resource arrangement information and equipment information; a third set of codes for causing a computer processor to determine that the equipment has incurred a location-changing event; and a fourth set of codes for causing a computer processor to, in response to determining that the equipment has incurred the location-changing event, register the location-changing event within the distributed trust computing network by creating a first block within the distributed register that includes information associated with the location-changing event, wherein the registering of the location-changing event within the distributed trust computing network provides for validating authenticity of the of the location-changing event.

19. The computer program product of claim 18, wherein the computer-readable medium further includes:
  a fifth set of codes for causing a computer processor to determine an occurrence of a resource arrangement-related event; and
  a sixth set of codes for causing a computer processor to, in response to determining the occurrence of the resource arrangement-related event, register the resource arrangement-related event with the distributed trust computing network by creating a second block within the distributed register that includes information associated with the resource arrangement-related event, wherein the registering of the resource arrangement-related event within the distributed trust computing networks provides for validating authenticity of the of the resource arrangement-related event.

20. The computer program product of claim 18, wherein the location-changing event is chosen from the group comprising of (i) physical movement of the equipment from a first location associated with an equipment provider to a second location associated with a resource recipient of the resource arrangement, (ii) physical movement of the equipment within a geo-fenced region defined by a location associated with a resource recipient of the resource arrangement, (iii) physical movement of the equipment outside of a geo-fenced region defined by a location associated with a resource recipient of the resource arrangement, and (iv) physical movement of the equipment from a first location associated with a first resource recipient of the resource arrangement to a second location associated with a transferred resource recipient of the resource arrangement.

* * * * *